(12) United States Patent
Cook (10) Patent No.: US 6,454,148 B1
(45) Date of Patent: Sep. 24, 2002

(54) COLLAPSIBLE CARGO CONTAINER

(76) Inventor: Lynnwood C. Cook, 3602 Melrose Ave., Destin, FL (US) 32541

( * ) Notice: Subject to any disclaimer, the term of this patent is extended or adjusted under 35 U.S.C. 154(b) by 0 days.

(21) Appl. No.: 09/599,328

(22) Filed: Jun. 22, 2000

(51) Int. Cl.[7] .................................................. B60R 7/00
(52) U.S. Cl. ....................... 224/404; 224/403; 224/498; 410/121
(58) Field of Search ................................. 224/403, 404, 224/497, 498, 499, 505, 506, 543, 547, 549, 555; 296/37.6; 410/129, 141, 121

(56) References Cited

U.S. PATENT DOCUMENTS

| | | | | | |
|---|---|---|---|---|---|
| 1,489,527 | A | * | 4/1924 | Henry | 220/6 |
| 2,697,631 | A | * | 12/1954 | Miller | 410/140 |
| 4,917,429 | A | * | 4/1990 | Giger | 296/37.6 |
| 5,526,972 | A | * | 6/1996 | Frazier et al. | 224/539 |
| 5,597,193 | A | * | 1/1997 | Conner | 296/37.6 |
| 5,715,978 | A | * | 2/1998 | Ackeret | 224/42.33 |

FOREIGN PATENT DOCUMENTS

DE  3238908 A1 * 4/1984

* cited by examiner

*Primary Examiner*—Paul T. Sewell
*Assistant Examiner*—Troy Arnold
(74) *Attorney, Agent, or Firm*—Waters & Morse, P.C.

(57) ABSTRACT

A collapsible cargo container is useful in combination with a cargo compartment or the like of a vehicle, which a cargo floor upon which cargo is carried, a first wall extending generally upward from the cargo floor, a second wall extending generally upward from the cargo floor, and a corner that is defined by an intersection of the first and the second walls. The cargo container comprises a first partition, a second partition, and a pivot that interconnects the first and second partitions. The first partition has a first end and an opposing second end, with the first end hingedly connected with the cargo compartment, so the first partition hinges between an open position in which the first partition extends generally away from the first wall, and a closed position in which the first partition extends generally along the first wall from the first end to the second end toward the corner. The second partition has a third end and an opposing fourth end, with the fourth end hingedly connected with the cargo compartment, so the second partition hinges between an open position in which the second partition extends generally away from the second wall, and a closed position in which the second partition extends generally along the second wall from the fourth end to the third end toward the corner. The pivot interconnects the second end and the third end, with the first partition, the second partition, and the connector defining at least a portion of the cargo container. The cargo container may include a base member that has a first edge hingedly connected with the first partition first end and a second edge hingedly connected with the second partition second end. The base member may be connected with the cargo compartment.

21 Claims, 5 Drawing Sheets

COLLAPSIBLE CARGO CONTAINER

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to cargo containers and more particularly to collapsible cargo containers used within a cargo compartment.

In many cargo transportation situations, a cargo compartment will be less than full of cargo. As such, the cargo that is carried in the compartment will tend to shift during transportation and possibly become damaged or cause injury. Thus, a smaller compartmentalization and containment of the cargo is desirable. That is, containerization of the cargo is desired to limit shifting. Further, versatility in having an option to use or not use the cargo container provides flexibility. Thus, one may see a need for or the desirability of a collapsible cargo container that is useful in a cargo compartment.

BRIEF SUMMARY OF THE INVENTION

Accordingly, a collapsible cargo container of the invention is useful in combination with a cargo compartment or the like of a vehicle. More particularly, the cargo compartment comprises a cargo floor upon which cargo is carried, a first wall extending generally upward from the cargo floor, a second wall extending generally upward from the cargo floor, and a corner that is defined by an intersection of the first and the second walls. The cargo container comprises a first partition, a second partition, and a pivot that interconnects the first and second partitions. Further, the first partition has a first end and an opposing second end. The first end is hingedly connected with the cargo compartment, so the first partition hinges between an open position in which the first partition extends generally away from the first wall, and a closed position in which the first partition extends generally along the first wall from the first end to the second end toward the corner. The second partition has a third end and an opposing fourth end. The fourth end is hingedly connected with the cargo compartment, so the second partition hinges between an open position in which the second partition extends generally away from the second wall, and a closed position in which the second partition extends generally along the second wall from the fourth end to the third end toward the corner. The pivot interconnects the second end and the third end, with the first partition, the second partition, and the connector defining at least a portion of the cargo container.

In other aspects of the invention, the first and the second partitions are releasably hingedly connected with the cargo compartment. More specifically, the first and the second partitions may be releasably hingedly connected with the cargo compartment by a spline and slot connector. Also, a releasable connector may be included between the cargo container and the cargo compartment. The releasable connector may be a spline and slot connector. Further, the cargo container may include a base member that has a first edge hingedly connected with the first partition first end and a second edge hingedly connected with the second partition second end. The base member may be connected with the cargo compartment. Further yet, a releasable connector may be included between the base member and the cargo compartment. The releasable connector may also be a spline and slot connector.

These and other features, objects, and benefits of the invention will be recognized by one having ordinary skill in the art and by those who practice the invention, from the specification, the claims, and the drawing figures.

DETAILED DESCRIPTION OF THE INVENTION

Figure 1:
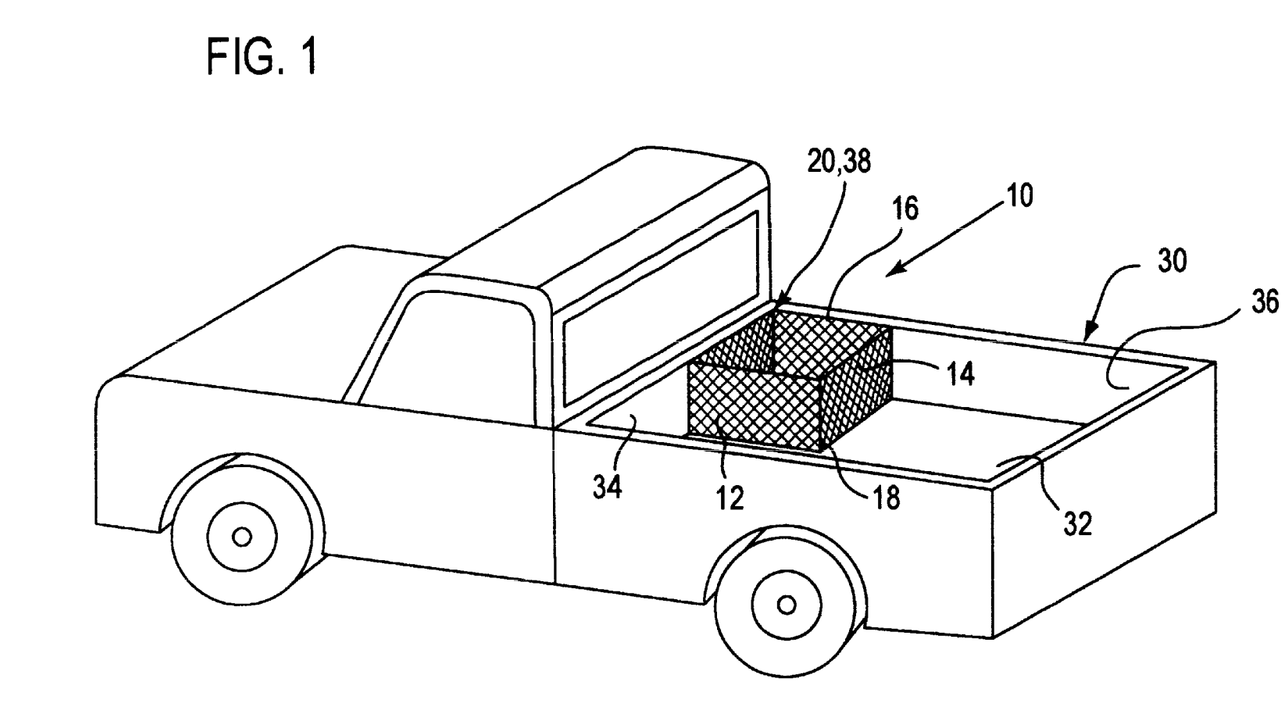
FIG. 1 is a perspective view of a truck, showing cargo compartment with a cargo container of the invention in an open position.
Figure 2:
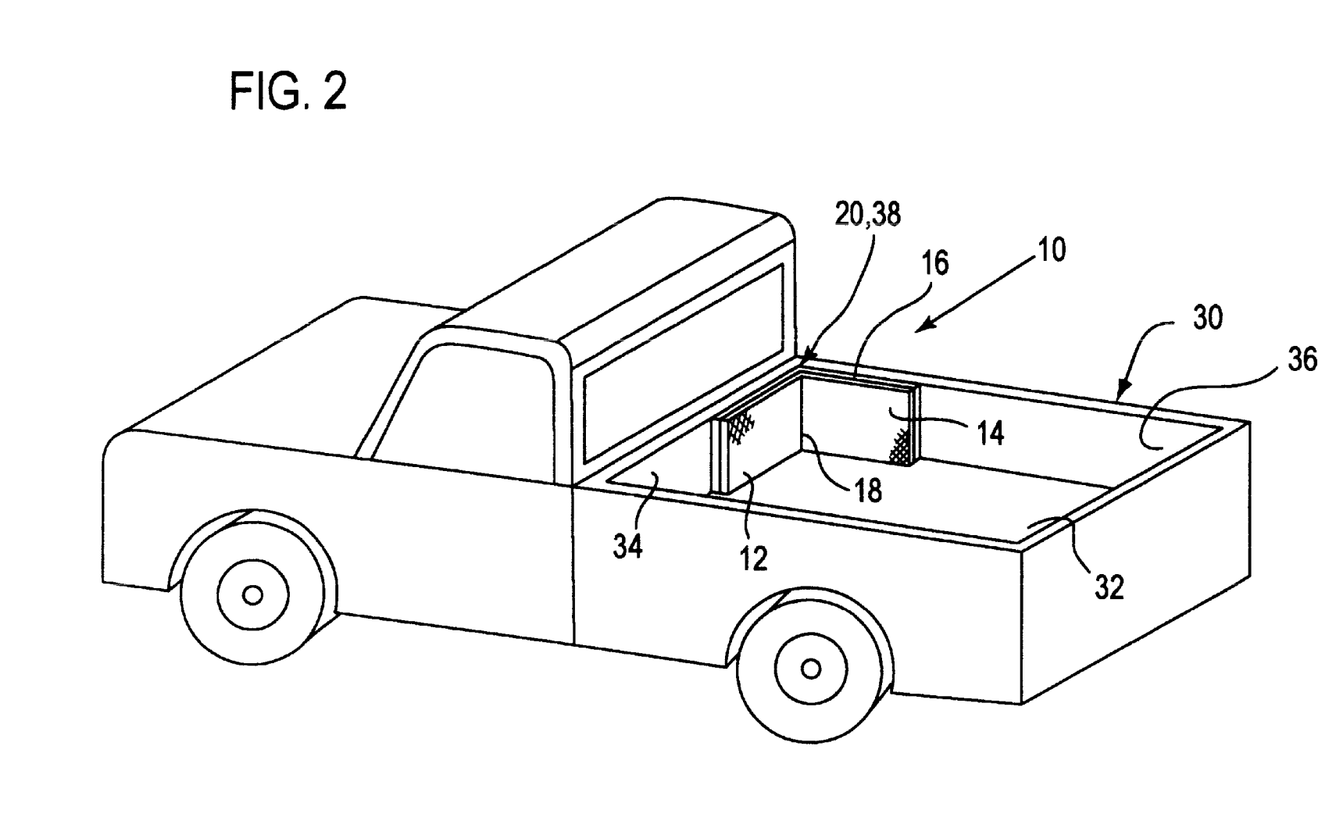
FIG. 2 is the view of FIG. 1, showing the cargo container in a collapsed position.

A collapsible cargo container 10 of the invention is generally shown in the drawing figures and most preferably includes a first partition 12, a second partition 14, a base member 16, a pivot 18, and a releasable connector 20. The container 10 is useful with a cargo compartment 30 that has a floor 32 upon which cargo is carried (FIGS. 1 and 2). A first wall 34 of the cargo compartment 30 extends generally upward from the cargo floor 32, as does a second wall 36. The first wall 34 and the second wall 36 intersect at a corner 38, which provides a convenient location for placement of the collapsible cargo container 10.

Figure 3:
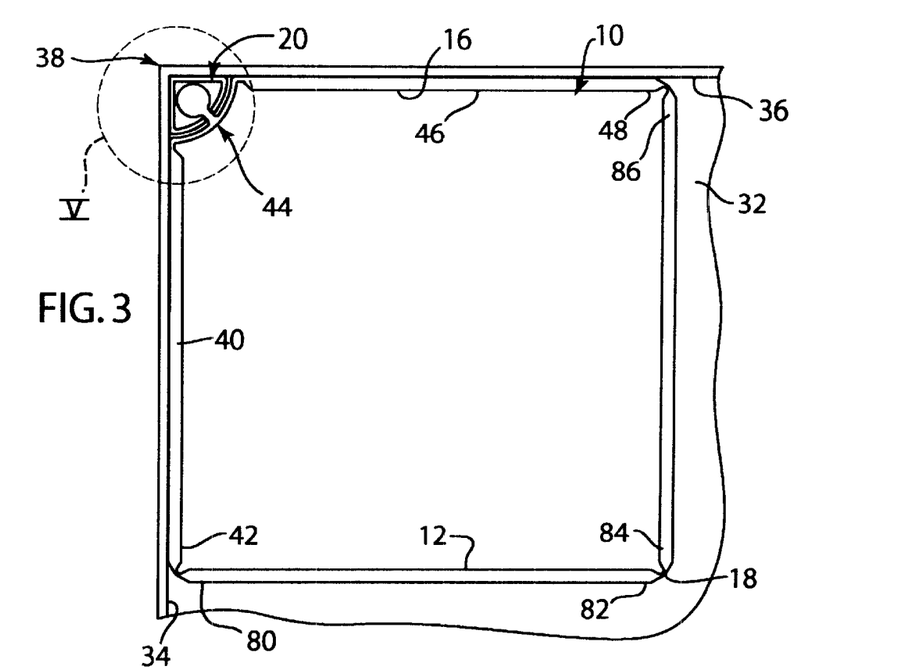
FIG. 3 is a fragmentary plan view along line III—III of FIG. 1.
Figure 4:
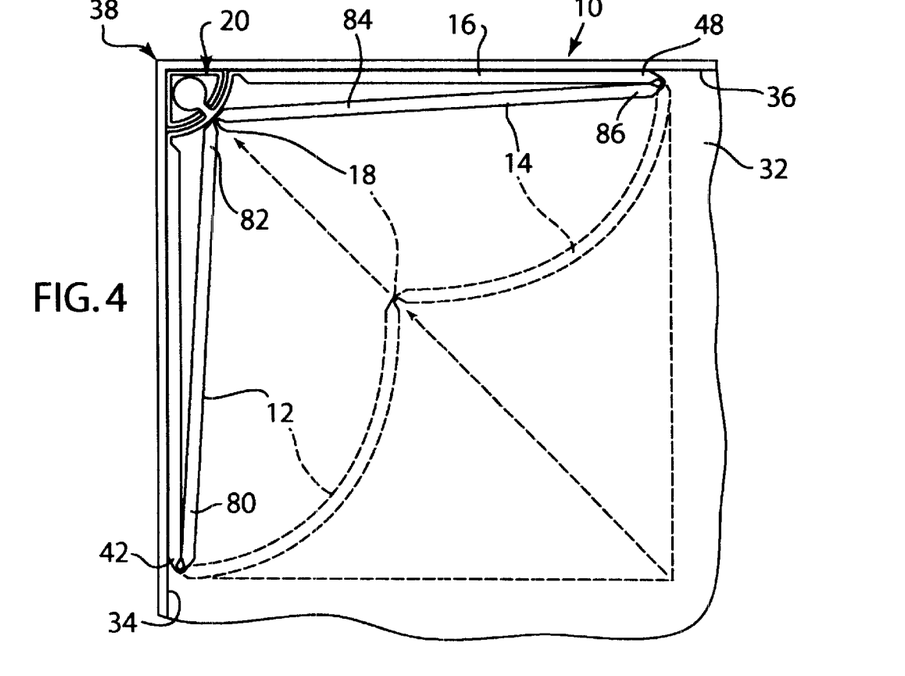
FIG. 4 is a fragmentary plan view along line IV—IV of FIG. 2.
Figure 5:
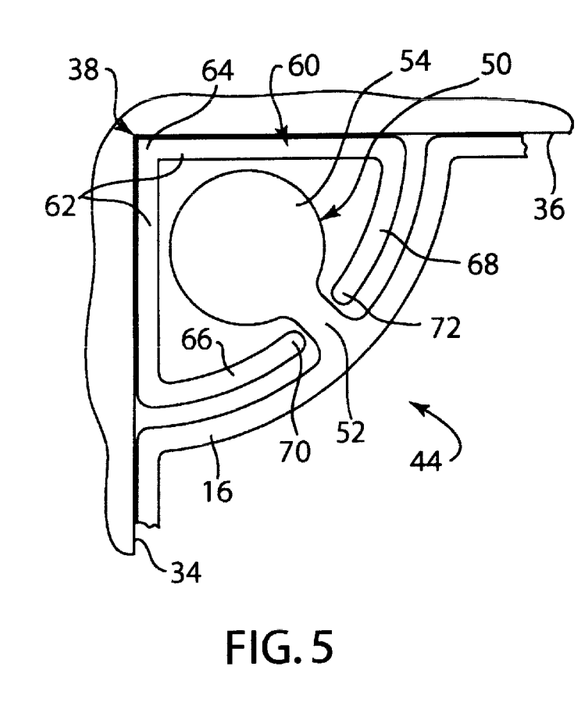
FIG. 5 is an enlarged fragmentary view of detail V of FIG. 3.

The base member 16 may have two arms that extend generally perpendicularly relative to one and another, from a common corner (FIGS. 3–5). A first arm 40 extends from the corner 44 to a first edge 42, while a second arm 46 extends from the corner 44 to a second edge 48. The base member 16 may be constructed of various structural materials by various methods as may be appropriate to the material selected. A durable plastic material is anticipated as the most likely fabrication material, while metals and woods may also be used, for example, as one having ordinary skill in the art will understand.

The releasable connector 20 is shown in the form of a spline and slot coupling between the base member 16 and the compartment corner 38 (FIGS. 3–5). At least a portion of the releasable connector 20 may be formed in part with the base member 16. More specifically, a bulbous spline 50 is preferably defined at the corner 44 with a relatively thin neck portion 52 extending to a relatively thick terminal bulb portion 54. While the spline 50 is preferably molded with the base member 16, it may also be an attached member.

A cooperating slotted channel member 60 may be fastened in the cargo compartment corner 38, between the first wall 34 and the second wall 36. The channel 60 may be constructed of any suitable structural material, including and not limited to metals, plastics, ceramics, and woods. The channel 60 may also be fabricated by any method that is appropriate to the material selected. A length of an extruded plastic channel is anticipated as a probable manufacture of the channel 60, for example.

The channel 60 is preferably a generally C-shaped member with two legs 62 extending generally orthogonally from a common corner 64. A first leg extends from the corner 64 to a first flange 66, and a second leg extends from the corner to a second flange 68. The first flange 66 extends from the first leg and toward the second leg, to a first terminal edge 70. The second flange 68 extends from the second leg and toward the first leg, to a second terminal edge 72. The first terminal edge 70 and the second terminal edge 72 are spaced apart and define a slot that allows sliding engagement with the neck 52, while blocking passage of the bulb 54 through the slot. The legs 62 may be fastened to the first wall 34 and the second wall 36 by any appropriate method, which may include adhesives, screw fasteners, and rivets, for example.

Thus, the neck 52 slides freely along a length of the channel 60, through a slot defined between the terminal edge 70 and terminal edge 72, while the bulb 54 is held within the channel. This holds the container 10 in a preselected location, in the corner 38 of the cargo compartment 30, rather than allowing the container to slide about the compartment 30. Conversely, the container 10 may be removed from the compartment 30 by merely lifting the container and sliding the spline 50 out an exposed upper end of the channel 60. One having ordinary skill in the art will know that the spline and slot connector 20 is only one of various releasable coupling configurations that may be successfully used with the invention.

The first partition 12 has a first end 80 and an opposing second end 82 (FIGS. 3 and 4). Likewise, the second partition 14 has a third end 84 and an opposing fourth end 86. The first partition first end 80 is preferably hingedly connected with the base member first edge 42, while the second partition fourth end 86 is preferably hingedly connected with the base member second edge 48. Thus, the first partition 12 hinges between an open position (FIGS. 1 and 3) in which the first partition 12 extends generally away from the first wall 34, and a closed position (FIGS. 2 and 4) in which the first partition extends generally along the first wall from the first end 80 to the second end 82 toward the corner 38. The second partition 14 also hinges between an open position (FIGS. 1 and 3) in which the second partition 14 extends generally away from the second wall 36, and a closed position (FIGS. 2 and 4) in which the second partition extends generally along the second wall from the third end 84 to the fourth end 86 toward the corner 38. Further, the first partition second end 82 is preferably pivotally connected with the second partition third end 84 by the pivot 18. Alternatively, the pivot 18 may be a releasable coupling or the connections between the first partition 12 or the second partition 14 and the base member 16 may be releasable connections. In any variation, the pivot 18 and the connection between the first partition 12 or the second partition 14 and the base member 16 are most preferably connectable in both the open and closed positions.

Most preferably, each of the pivot 18 and the connection between the first partition 12 or the second partition 14 and the base member 16 is a hinging or pivoting connection and at least one of the first partition and the second partition is resilient, so the container 10 is collapsible from the open position to the closed position without releasing any of the connections among the first partition, the second partition, and the base member (FIG. 4). Thus, the first partition 12 and the second partition 14 are most preferably molded of a resilient moldable material. Further, the first partition 12 and the second partition 14 may be molded as a single or unitary member with the pivot 18 being a living hinge, which is known by one having ordinary skill in the art.

Further, the first partition 12 or the second partition 14 and the base member 16 may also be molded as a single or unitary member with the connection between them being a living hinge. Alternatively, all three of the first partition 12, the second partition 14, and the base member 16 may be molded as a single or unitary member with the pivot 18 and the connections between them being living hinges. Again alternatively, each of the hinged connections and the pivot 18 may be a pin connector, for example, that is connectable in the open and the closed positions. One having ordinary skill in the art will understand that various other interconnections among and between the first partition 12, the second partition 14, and the base member 16, which provide connection in the open and the closed positions may be used.

Figure 6:
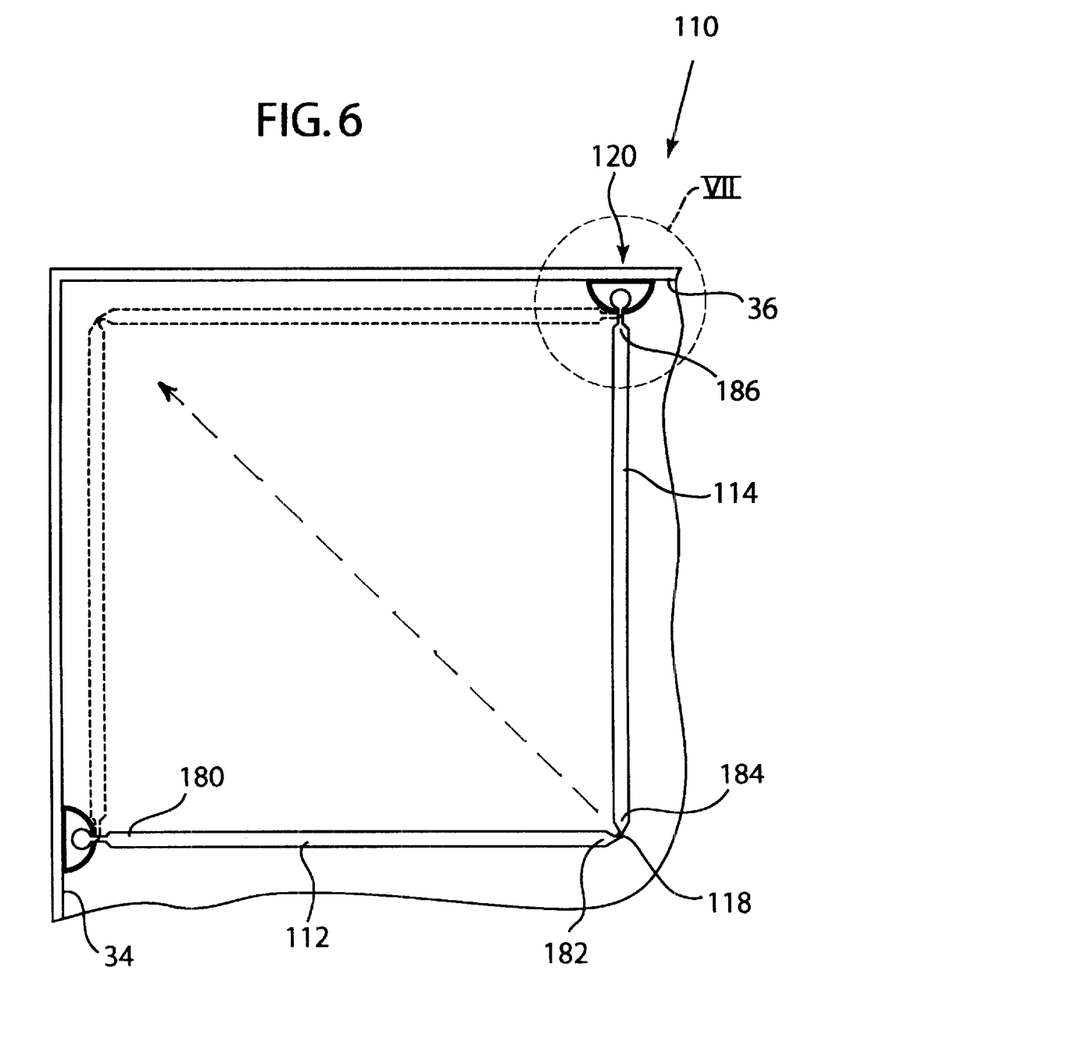
FIG. 6 is the view of FIG. 3, showing a first alternative embodiment of the cargo container.
Figure 7:
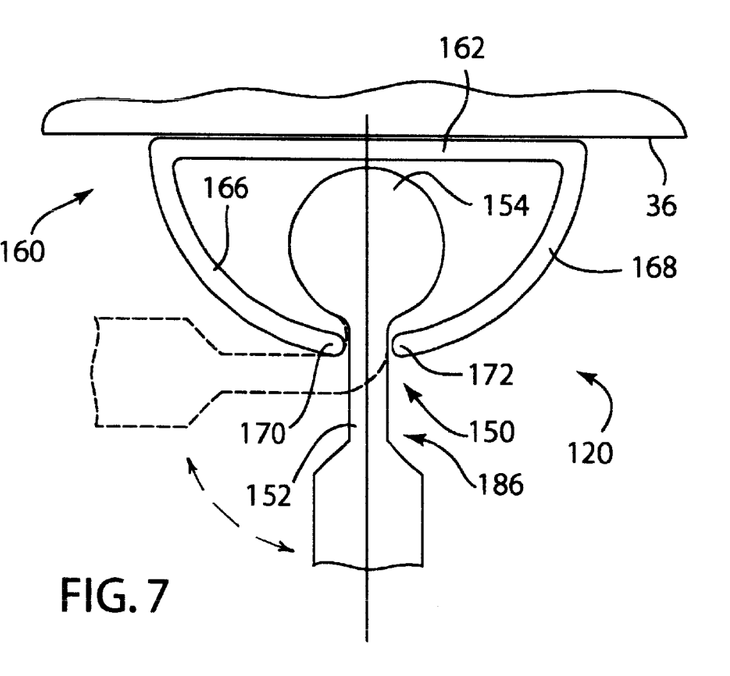
FIG. 7 is an enlarged fragmentary view of detail VII of FIG. 6.

In one alternative embodiment of the invention, a collapsible cargo container 110 preferably includes a first partition 112, a second partition 114, a pivot 118, and a releasable connector 120 (FIGS. 6 and 7). The container 110 is similar to the collapsible cargo container 10, excepting for not using a base member 16. Thus, first partition 112 has a first end 180 and an opposing second end 182. And, second partition 114 has a third end 184 and an opposing fourth end 186. The first partition first end 180 is preferably hingedly connected with the first wall 34 by a first releasable connector 120, while the second partition fourth end 186 is preferably hingedly connected with the second wall 36 by a second releasable connector 120.

As with the connector 20 of embodiment 10, the releasable connector 120 is shown in the form of a spline and slot coupling between the walls 34 and 36 and the partitions 112 and 114, respectively. At least a portion of the releasable connector 120 may be formed in part with each of the ends 180 and 186. More specifically, a bulbous spline 150 is preferably defined at the ends 180 and 186 with a resilient and relatively thin neck portion 152 extending to a relatively thick terminal bulb portion 154 (FIG. 7). While each spline 150 is preferably molded with the ends 180 and 186, they may also be attached members.

A cooperating slotted channel member 160 may be positioned and fastened to the first wall 34 and the second wall 36. The channel 160 may be constructed of any suitable structural material, including and not limited to metals, plastics, ceramics, and woods. The channel 160 may also be fabricated by any method that is appropriate to the material selected. A length of an extruded plastic channel is anticipated as a probable manufacture of the channel 160, for example.

The channel 160 is preferably a generally C-shaped member with a back plate member 162 that is attachable to one of the walls 34 and 36 by any appropriate method, which may include adhesives, screw fasteners, and rivets, for example. A pair or opposing arcuate flanges 166 and 168 extend from the back plate 162. The first flange 166 extends to a first terminal edge 70, while the second flange 168 extends to a second terminal edge 172. The first terminal edge 170 and the second terminal edge 172 are spaced apart and define a slot that allows sliding engagement with the neck 152, while blocking passage of the bulb 154 through the slot.

Thus, the neck 152 slides freely along a length of the channel 160, through a slot defined between the terminal edge 170 and terminal edge 172, while the bulb 154 is held within the channel. This holds the container 110 in a preselected location, in the corner 38 of the cargo compartment 30, rather than allowing the container to slide about the compartment 30. Conversely, the container 110 may be removed from the compartment 30 by merely lifting the container and sliding the spline 150 out an exposed upper end of each channel 160. One having ordinary skill in the art will know that the spline and slot connector 120 discussed above is only one of various releasable coupling configurations that may be successfully used with the invention. One of numerous alternative configurations of the releasable coupling 120 may include the commonly known pin or leaf hinge configuration. In this alternative, one leaf may be attached to the walls 34 and 36 while the cooperating leaf may be formed into or attached to each of the ends 180 and 186. The cooperating leaves are then mated and interconnected with a slip fit hinge pin, all as one having ordinary skill in the art will understand.

So connected, the first partition 112 hinges between an open position in which the first partition extends generally away from the first wall 34, and a closed position in which the first partition extends generally along the first wall from the first end 180 to the second end 182 toward the corner 138, as with the first partition 112 of the first container 10 embodiment. The second partition 114 also hinges between an open position in which the second partition 114 extends generally away from the second wall 36, and a closed position in which the second partition extends generally along the second wall from the third end 184 to the fourth end 186 toward the corner 38. Further, the first partition second end 182 is preferably pivotally connected with the second partition third end 184 by the pivot 118. Again, the pivot 118 may alternatively be a releasable coupling or the connections between the first partition 112 or the second partition 114 and the respective wall 34 and wall 36 may be releasable connections. In any variation, the pivot 118 and the connection between the first partition 112 or the second partition 114 and the walls 34 and 36 are most preferably connectable in both the open and closed positions.

It will be understood by one having ordinary skill in the art and by those who practice the invention, that various modifications and improvements may be made without departing from the spirit of the disclosed concept. Various relational terms, including left, right, front, back, top, and bottom, for example, are used in the detailed description of the invention and in the claims only to convey relative positioning of various elements of the claimed invention. The scope of protection afforded is to be determined by the claims and by the breadth of interpretation allowed by law.

I claim:

1. The combination of a cargo compartment and a collapsible cargo container within the compartment, comprising:
    a cargo floor upon which cargo is carried;
    a first wall extending generally upward from the cargo floor;
    a second wall extending generally upward from the cargo floor;
    a corner that is defined by an intersection of the first and the second walls, the cargo floor, the first wall, the second wall, and the corner defining at least a portion of the cargo compartment;
    a first partition, the first partition having a first end and an opposing second end, the first end being hingedly connected with the cargo compartment, the first partition hinging between an open position in which the first partition extends generally away from the first wall, and a closed position in which the first partition extends generally along the first wall from the first end to the second end toward the corner;
    a second partition, the second partition having a third end and an opposing fourth end, the fourth end being hingedly connected with the cargo compartment, the second partition hinging between an open position in which the second partition extends generally away from the second wall, and a closed position in which the second partition extends generally along the second wall from the fourth end to the third end toward the corner; and
    a pivot connector that interconnects the second end and the third end, the first partition, the second partition, and the pivot connector defining at least a portion of the cargo container.

2. The combination defined in claim 1 wherein the first and the second partitions are released hingedly connected with the cargo compartment.

3. The combination defined in claim 1 wherein the first and the second partitions are released hingedly connected with the cargo compartment by a spline and slot connector.

4. The combination defined in claim 1 further including a releasable connector that hingedly interconnects the cargo container and the cargo compartment.

5. The combination defined in claim 4 wherein the releasable connector is a spline and slot connector.

6. The combination defined in claim 1 wherein the cargo container further includes a base member, the base member having a first edge hingedly connected with the first partition first end, the base member having a second edge hingedly connected with the second partition second end, and wherein the base member is connected with the cargo compartment.

7. The combination defined in claim 6 further including a releasable connector between the base member and the cargo compartment.

8. The combination defined in claim 7 wherein the releasable connector is a spline and slot connector.

9. The combination of a cargo compartment and a collapsible cargo container within the compartment, comprising:
    a cargo floor upon which cargo is carried;
    a first wall extending generally upward from the cargo floor;
    a second wall extending generally upward from the cargo floor;
    a corner that is defined by an intersection of the first and the second walls, the cargo floor, the first wall, the second wall, and the corner defining at least a portion of the cargo compartment;
    a first partition, the first partition having a first end and an opposing second end, the first end being hingedly connected with the first wall, the first partition hinging between an open position in which the first partition extends generally away from the first wall, and a closed position in which the first partition extends generally along the first wall from the first end to the second end toward the corner;
    a second partition, the second partition having a third end and an opposing fourth end, the fourth end being hingedly connected with the second wall, the second partition hinging between an open position in which the second partition extends generally away from the second wall, and a closed position in which the second partition extends generally along the second wall from the fourth end to the third end toward the corner; and a pivot connector that interconnects the second end and the third end, the first partition, the second partition, and the pivot connector defining at least a portion of the cargo container.

10. The combination defined in claim 9 wherein the first and the second partitions are releasably connected with the first wall and the second wall respectively by a spline and slot connector.

11. The combination defined in claim 9 wherein the cargo container further includes a base member, the base member having a first edge hingedly connected with the first partition first end, the base member having a second edge hingedly connected with the second partition second end, and wherein the base member is connected with the cargo compartment.

12. The combination defined in claim 11 further including a releasable connector between the base member and the cargo compartment.

13. The combination defined in claim 12 wherein the releasable connector is a spline and slot connector.

14. The combination of a vehicle cargo compartment and a collapsible cargo container that provides a storage area of reduced size in the cargo compartment, the cargo compartment comprising a floor with compartment walls bordering the floor, adjacent compartment walls being connected at corners, the cargo container comprising a pair of container walls pivotally connected together at inner edges thereof, opposite outer edges of the container walls being pivotally connected to adjoining walls of the storage compartment at locations such that the walls of the cargo container extend substantially to the corner of the storage compartment when the container is in a collapsed condition, the walls of the container extending outwardly into the storage compartment to provide a reduced size storage area in the storage compartment when the container walls are in an extended position.

15. The combination of claim 14 wherein at least one of the container walls is resilient, such that the container walls can bend sufficiently that the container walls can be moved between their extended and collapsed positions without disconnecting the container walls from the compartment or from themselves.

16. The combination of claim 14 wherein the storage compartment walls to which the container is mounted are at substantially right angles to each other and the container walls are at substantially right angles to each other when in their extended and collapsed positions, the container walls being formed and connected such that the container walls can be moved between their extended and collapsed positions without disconnecting the container walls from themselves or the compartment walls.

17. The combination of claim 14 wherein the container walls are connected together by a flexible living hinge.

18. The combination of claim 14 wherein the container walls are pivotally connected to the compartment walls by hinges that interconnect the outer edges of the container walls to the compartment walls.

19. The combination of claim 18 wherein each hinge comprises a slotted channel member attached to the compartment wall, with the slot in the channel member having an enlarged interior portion and a more narrow outer portion at an outer edge thereof, the hinge further comprising a spline portion at the outer edge of the container wall, the spline portion having an enlarged bulbous portion on a flexible, more narrow neck, the bulbous portion fitting in the enlarged portion of the channel slot, with the neck fitting through the more narrow portion of the channel slot, the more narrow portion of the slot holding the bulbous portion in the channel but permitting pivotal movement thereof in the channel.

20. The combination of claim 19 wherein the slot in the channel member has an open top that permits the container walls to be disengaged from the channel members and the storage compartment walls by sliding the splines in the container walls out of the channel members through the open tops of the slots.

21. The combination of claim 19 wherein the splines are integrally molded in the outer edges of the container walls.

* * * * *

UNITED STATES PATENT AND TRADEMARK OFFICE
CERTIFICATE OF CORRECTION

PATENT NO. : 6,454,148 B1
DATED : September 24, 2002
INVENTOR(S) : Cook, Lynnwood C.

It is certified that error appears in the above-identified patent and that said Letters Patent is hereby corrected as shown below:

Column 6,
Lines 20 and 23, "released" should be -- releasably --.

Signed and Sealed this

Fourth Day of February, 2003

JAMES E. ROGAN
*Director of the United States Patent and Trademark Office*